Aug. 30, 1955  G. E. CHILDS  2,716,498
AUTOMATIC GLASS LEVEL CONTROL APPARATUS
Filed April 26, 1952  3 Sheets-Sheet 1

INVENTOR
G. E. CHILDS
BY
ATTORNEY

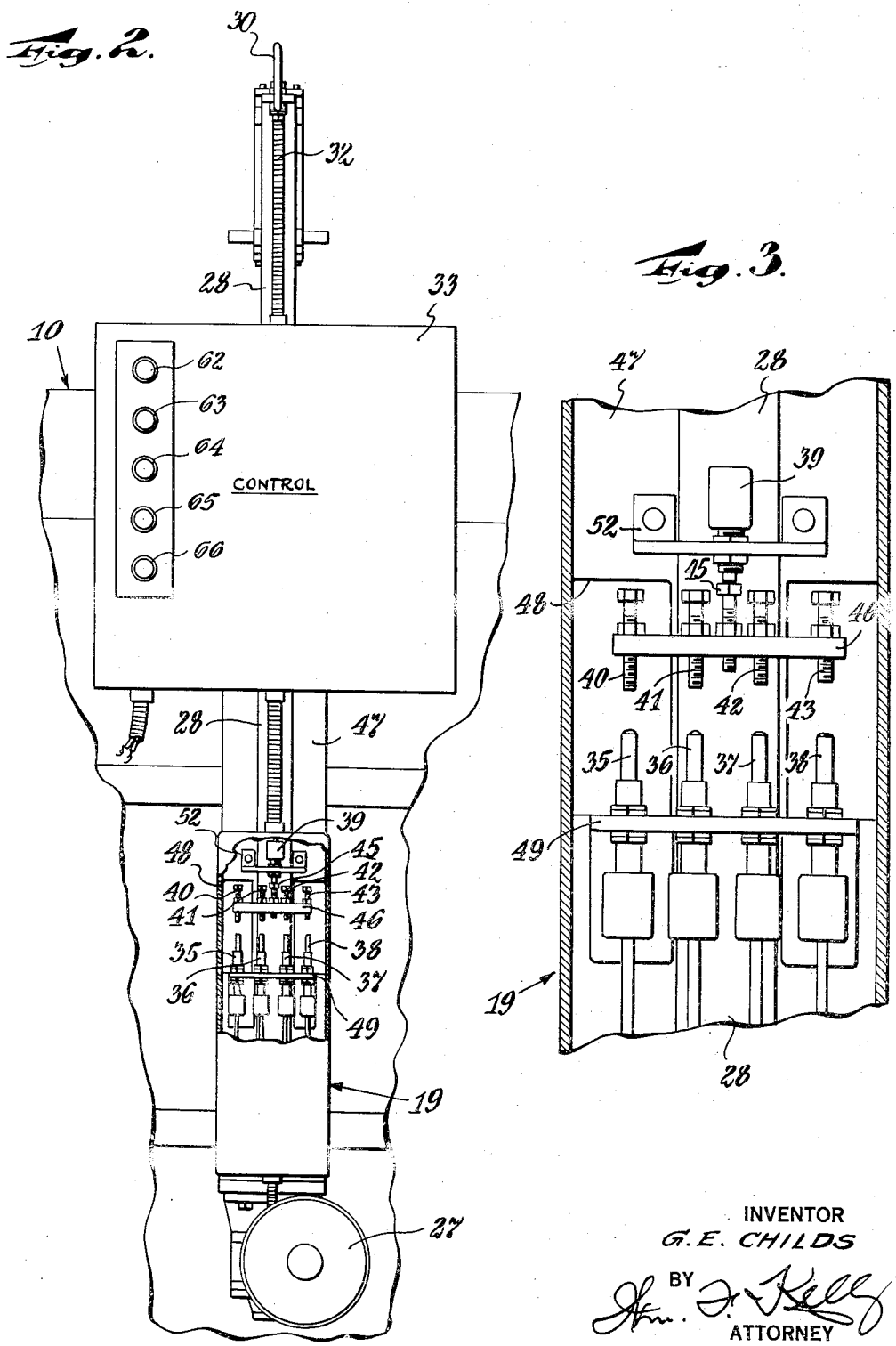

Aug. 30, 1955 G. E. CHILDS 2,716,498
AUTOMATIC GLASS LEVEL CONTROL APPARATUS
Filed April 26, 1952 3 Sheets-Sheet 3

INVENTOR
G. E. CHILDS
BY
ATTORNEY

United States Patent Office 2,716,498
Patented Aug. 30, 1955

2,716,498

AUTOMATIC GLASS LEVEL CONTROL APPARATUS

Gordon E. Childs, Fairmont, W. Va., assignor to Westinghouse Electric Corporation, East Pittsburgh, Pa., a corporation of Pennsylvania Application April 26, 1952, Serial No. 284,568

5 Claims. (Cl. 214—18.2)

This invention relates to the production of glass and, more particularly, to automatic control apparatus for maintaining molten glass in a melting tank or furnace at a desired level.

In the manufacture of glass, it is very desirable to maintain constant the level of the molten glass in the melting furnace. The density of the charge supplied to the furnace by batch feeders of the conventional type varies with the atmospheric conditions and different sources of supply of raw material used. The output from the tank will vary due to production demands. In addition, to meet these requirements non-automatic checking of the glass level involves continual re-adjustment of batch feeding rates by the glass tank operator and calls for the exercise of considerable judgment.

Years of experience are accordingly required on the part of an operator before his judgment approaches reliability and, even after developing a definite skill, these prior known methods of determination are still subject to the human element.

It is accordingly the primary object of the present invention to eliminate the human element by automatically maintaining a desired constant level of molten glass in a melting furnace.

A specific object of the present invention is to provide means for gaging the existing level of molten glass and adjusting automatically the batch feeding rate to compensate for variations in the glass level.

Other objects of the invention will appear to those skilled in the art to which it appertains as the description proceeds.

Referring to the accompanying drawings, in which like symbols of reference designate similar parts throughout the several views:

Fig. 2 is a view of the probe assembly in Fig. 1, in a direction toward the furnace, and showing the relay-control and limit switches thereof.

Fig. 3 is an enlarged view of a portion of the mechanism of Fig. 2, showing in detail the setting of the relay-control and limit switches.

Figure 1:
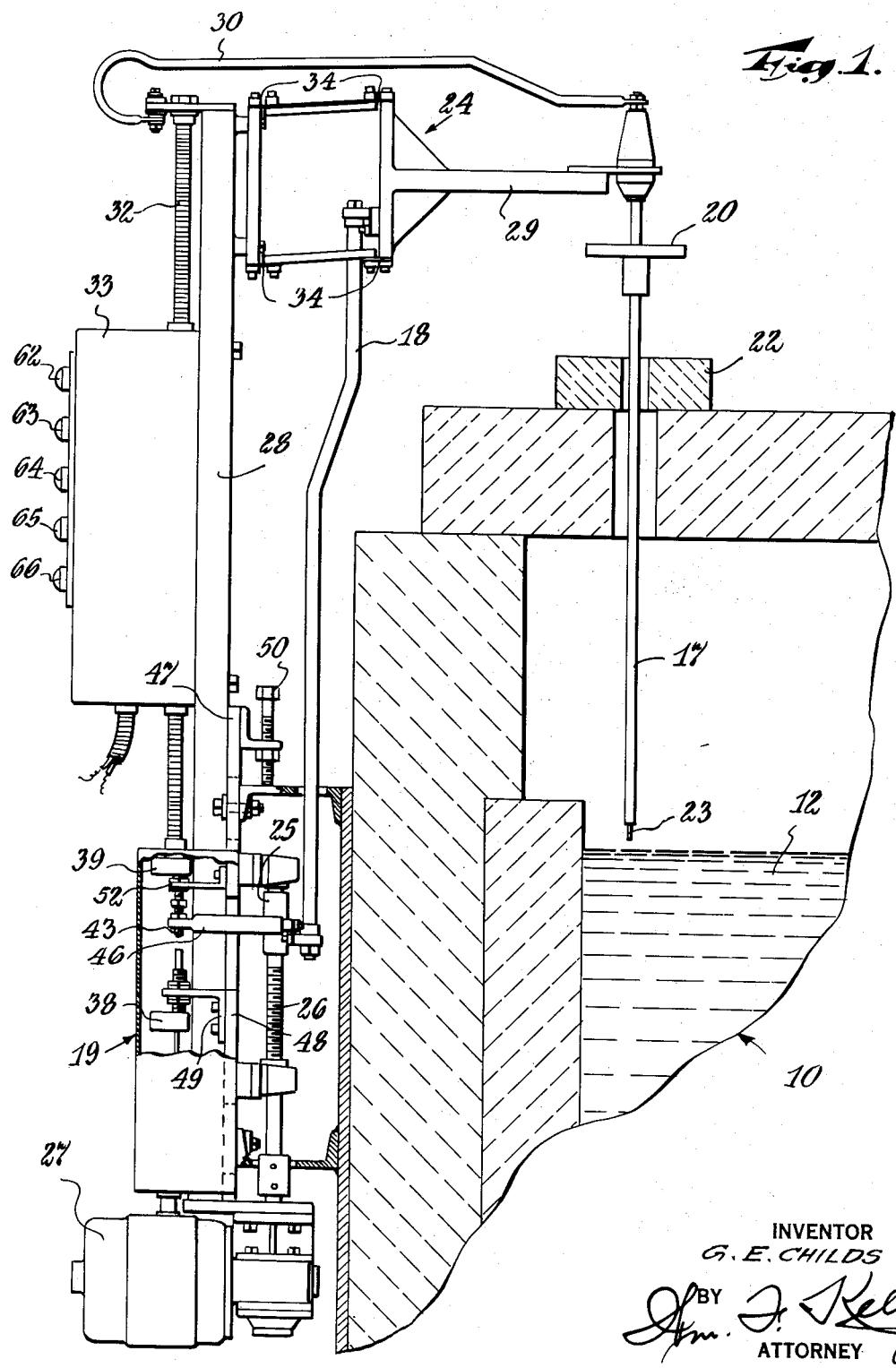
Fig. 1 is a side elevational view, partly in section, of a portion of a glass melting furnace equipped with a probe assembly embodying my invention.

As hereinbefore stated, it has been found advantageous to provide an automatic glass level control apparatus which, according to the present invention may consist of two main assemblies; a probe assembly for measuring the existing glass level, and an electric control mechanism for adjusting the batch feeding rate to maintain the desired level.

This probe may be of any suitable heat-resisting construction which will satisfactorily conduct an electric current on making contact with the surface of the molten glass. It is mounted so that it is movable up and down by any suitable source of power. The probe assembly itself contains a gaging unit made up of four relay-control switches and a limit switch, which are operated by an extension yoke attached to a probe push-rod, with the limit switch stopping the probe when it is withdrawn from the glass after gaging the level.

The electric control mechanism for adjusting the batch feeding rate consists of a multi-section adjustable repeat cycle timing device, five electric relays of the latching type, and suitable starting and reversing means for the probe power source. The relay-control switches and the limit switch in the probe assembly are each connected to a separate latching relay in the electric control mechanism. Adjusting screws which operate the relay-control switches and the limit switch are individually adjustable, set to actuate the relay-control switches, and finally the limit switch in succession as the probe descends, and to actuate the limit switch when the probe has been withdrawn from the glass. A small transformer may be employed to provide low voltage for the circuit. Five indicating lights are also incorporated to give a visual indication of the molten glass level. The indicator lights are connected to the contacts of the latching relays and show which relays are in operation. The lights will function independently of the batch charger control, and will indicate the glass level even when the charger running time is independently controlled.

In operation, the initial adjustment of the timer sets the duration of a complete cycle. The probe power source is started near the beginning of each cycle by the first section of the timer, in conjunction with one of the latching relays. The probe moves down until it contacts the surface of the glass and the electric current, which then flows, releases the latching relay, thereby reversing the direction of travel of the probe until it is stopped by the upper limit switch.

The operation of the automatic glass level control apparatus may be summarized as follows:

1. When the glass level is much too high, none of the relay-control switches in the probe assembly will be actuated before the probe touches the glass and retracts. Consequently none of the latching relays in the electric control mechanism will close and the batch feeder will not operate during this cycle.

2. When the glass level is slightly high, the first relay-control switch in the probe assembly is depressed by the probe yoke, before the probe touches the glass and retracts. The first latching relay of the electric control mechanism is cut in by its control switch, and the batch charger is connected to section two of the timer, which is set for a shorter than normal running time.

3. When the glass level is normal, the first two relay-control switches are depressed in succession before the probe touches the glass and retracts, thereby cutting in two latching relays of the electric control mechanism. Since the latching relay contacts are in series, the second latching relay takes control and connects the batch charger to the third timer section, which is set for the normal running of the batch charger.

4. When the glass level is slightly low the first three relay-control switches of the probe assembly cut in three corresponding latching relays of the electric control mechanism. The batch charger, being then connected to the fourth timer section by the third of these latching relays, runs for a longer than normal period as set by the fourth timer section.

5. When the glass level is very low, the probe fails to contact the glass before the fourth relay-control switch of the probe assembly and its corresponding latching relay of the electric control mechanism are actuated by the probe yoke. This fourth latching relay stops the downward movement of the probe and connects the batch charger directly to the line. The batch charger then runs continuously until the glass level rises sufficiently to contact the probe which then retracts and resumes its normal cycle.

Figure 4:
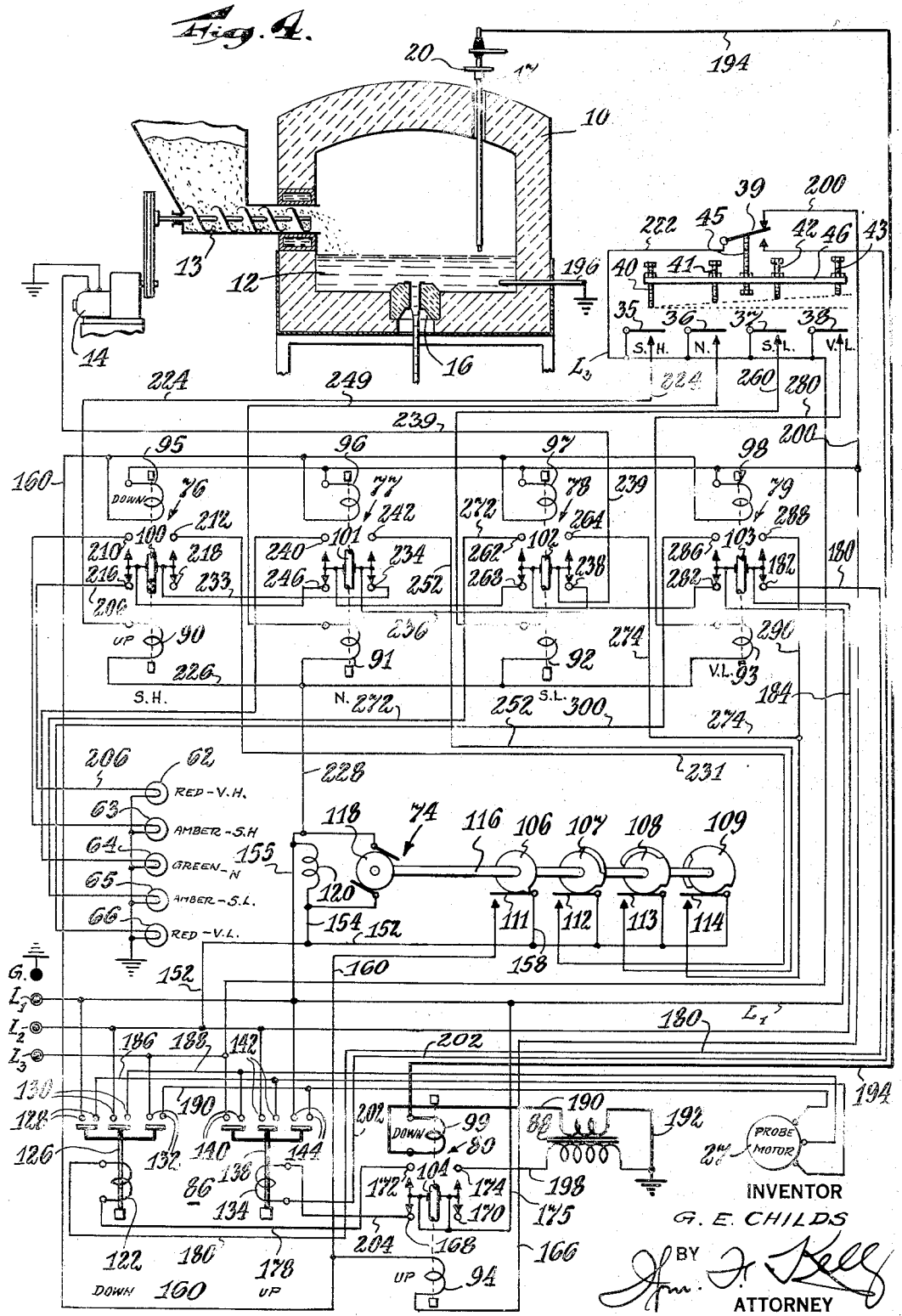
Fig. 4 is a diagrammatic and schematic view with a wiring diagram of the apparatus.

Referring now to the accompanying drawings for a more specific illustration of the present invention, and more particularly to Figs. 1, 4 thereof, a glass furnace or tank 10 is shown which is formed of a suitable refractory material for containing molten glass 12. A batch charger 13, the hopper of which may be replenished as needed by suitable means, is provided. The charger 13 is driven by a motor 14 and has its delivery end extending through a suitable opening provided in one of the side walls of the furnace 10, such as seen in Fig. 4. One such suitable hopper-replenishing apparatus is disclosed in the Whitmore et al. Patent No. 2,585,607, dated February 12, 1952. An orifice or take-off 16 is provided in the bottom of the furnace for withdrawal of the molten glass.

Probe assembly

The aforementioned probe assembly of the automatic glass level control apparatus consists of a glass level probe 17 (Fig. 1), an operating rod 18 for vertically reciprocating the probe 17, and a gaging unit 19. The probe 17 is of heat-resisting construction and consists of two longitudinally separated but electrically connected refractory metal rods, formed of material such as Nichrome, integrated by a combination connector and heat deflector 20. It extends through suitable holes in a cover 22 (Fig. 1) mounted above an opening in the top of the furnace 10. The probe 17 has its tip 23 normally disposed above the surface of the molten glass 12.

The operating rod 18 (Fig. 1), for reciprocating the probe 17, is connected at its upper end to a flexible yoke 24, while its lower end is connected by a threaded collar 25 to an operating screw 26 journalled in suitable bearings and rotated by a probe motor 27 carried by a plate secured to a probe assembly mounting post 28. The probe 17 is supported near its upper end by a bracket 29 extending from the flexible yoke 24. A flexible or springlike conductor 30 and cable conductor 32 connect the probe 17 to a control box 33 which is suitably secured to the post 28, or may be located remote therefrom on a suitable control panel.

The flexible yoke 24 is formed of a generally parallelogram-like configuration, as shown in Fig. 1, and one side is rigidly secured to the post 28. The opposite side, which supports the bracket 29, is connected thereto through spacing members by thin spring-like strips 34.

Gaging unit

The gaging unit 19, shown in Figs. 1, 2 and 3, comprises four relay-control switches 35, 36, 37 and 38 and a probe stop limit switch 39. Adjustable and movable switch operating members 40, 41 and 43 for the four switches 35 to 38, inclusive, and the adjustable and movable switch operating member 45 for the limit switch 39, are supported on an extension yoke 46 which is mounted on the threaded collar 25 (Fig. 1) and surrounds the post 28. It will be understood that the portion of each successive movable switch contacts 40 through 43 depending below the yoke 46 (Figs. 2, 3 and 4) is successively shorter by a predetermined amount than the depending portion of the preceding contact, so that during the downward travel of the probe 17 by the rotating screw 26, the switches 35 through 38 are successively closed by said contacts carried by the probe assembly.

A vertical plate 47, shown in Figs. 1, 2, and 3, having a center portion 48 of reduced width to permit the vertical travel of the extension yoke 46 thereabout, is secured as by bolts to the probe assembly mounting post 28. A bracket 49 mounted on this plate 47 supports the above mentioned switches 35 to 38. The entire probe assembly is carried by the ironwork of the furnace wall, as shown, and is vertically adjustable relative thereto by an adjusting screw 50. The limit switch 39 is carried by a bracket 52 similar to the bracket 49.

Electric control mechanism

The aforementioned electric control mechanism is contained in a box 33 (Figs. 1 and 2) mounted on the post 28 and comprises five signal lamps 62, 63, 64, 65 and 66 suitably red, amber, green, amber and red, respectively, and desirably disposed along a vertical line as shown in Figs. 1 and 2; a multisection adjustable repeat cycle timer 74, four conventional latching type relays 76, 77, 78, 79, in electrical series with each other, a fifth latching type relay 80 controlling the operation of the probe motor 27, a three-phase reversing switch 86 for starting and reversing the probe motor 27, and a transformer 88, to supply power at low voltage, as shown in Fig. 4.

The five latching relays, 76 thru 80, are provided with identical "up" solenoid coils, 90 through 94, and identical "down" solenoid coils 95 through 99, for actuating their respective solenoid armatures 100 through 104. The multi-section timer 74 comprises four cams 106 through 109, for operating adjacent switches, 111 through 114. The cams are mounted on a cam shaft 116 driven by a cam motor 118 having a winding 120. The four cams, 106 through 109, and their corresponding switches, 111 through 114, comprise the first, second, third, and fourth sections, respectively, of the timer 74.

The conventional three-phase reversing switch 86 comprises a "down" solenoid 122 having an armature 126 for opening and closing three pairs of contacts 128, 130 and 132, and an "up" solenoid 134 having an armature 138 for opening and closing three similar pairs of contacts 140, 142 and 144.

Timer circuit

The motor 118 of the timer 74 of my automatic glass control apparatus starts running continuously as soon as the apparatus is connected to the power line at terminals $L_1$, $L_2$ and $L_3$. G indicates the grounded connection with the generator. In a typical case, the cam shaft 116 will be adjusted to revolve once every three minutes, this three-minute interval thus comprising a "cycle." The adjustment of the cam shaft speed can be accomplished by any sutable means, such as change gears (not shown) in the drive between the motor 118 and the cam shaft 116. This motor 118 is energized by a circuit which extends from the line conductor $L_2$ by means of a common conductor 152 and a branch conductor 154, to one side of the stator winding 120, as well as one side of the motor armature and thence from the other side of the armature and stator winding 120 by means of a conductor 155, to the opposite side $L_1$ of the single phase supply source.

Rotation of the motor 118 and shaft 116 causes the first section cam 106 to close its adjacent switch 111, thus energizing the "up" coil 94 of the first latching relay 80. This relay winding 94 receives energy from the common conductor 152 (which may be considered as supply source $L_2$ so long as switch 111 remains closed) through a conductor 158, the now closed switch 111, a conductor 160 to one end of coil 94, thence from the other end of this coil 94 by a conductor 166, to the other side of the single phase supply source $L_3$, by way of limit-switch 39.

The armature of the relay 80, which is itself provided with contacts, moves upwardly, in the present showing, thus disengaging the armature contacts from a pair of normally engaged contacts 168 and 170. At the same time the upward movement of the armature of relay 80 causes engagement of its armature contacts with a pair of normally disengaged contacts 172 and 174. Upon reaching the upper limit of its travel, the armature of relay 80 remains latched in this "up" position, even after the de-energizing of the "up" coil 94 by opening of switch 111 due to further rotation of cam 106.

Probe motor

The engagement of the contacts of relay 80 with the upper contacts 172 and 174 energizes the "down" solenoid 122 of the reversing switch 86, to close an energizing circuit to the three phase probe motor 27 and also energize transformer 88. The circuit to solenoid 122 extends from supply conductor $L_1$, through conductor 175, the left hand contact (as viewed in Fig. 4) of the armature of relay 80, now engaging contact 172, through conductor 178 to winding 122, thence by a conductor 180 to a normally closed lower contact 182 engaged by the right hand armature contact of latching relay 79 (insulated from the left hand contact thereof, as illustrated) and then by a conductor 184 back to supply conductor $L_2$. Energization of solenoid coil 122 causes the armature 126 to rise, shorting across the contacts 128—128, 130—130, and 132—132, so that energy is now supplied from the three phase source $L_1$, $L_2$, $L_3$, by means of conductors 186, 188 and 190 to the three phase probe motor 27.

Engagement of the right hand armature contacts of relay 80 with the contact 174 completes a circuit from supply conductor $L_1$, through conductor 175, contact 174, conductor 198, primary winding of transformer 88, to ground. Although the secondary winding of transformer 88 thus becomes energized, no current flows since only a partially completed circuit is formed from ground through the secondary winding of transformer 88, conductor 190, the "down" coil 99 of relay 80, conductor 194 to probe 17 which is suspended above and thus disconnected from the molten glass 12 in the furnace 10.

Rotation of the probe motor 27, and hence the operating screw 26, upon shorting of "down" armature contacts 128—128, 130—130, 132—132, of reversing switch 86 causes the collar 25 and the probe 17 to move downwardly towards the surface of the molten glass 12 within the furnace 10.

Operation of relay control switches and latching relays

Simultaneously with the downward movement of the probe 17, the extension yoke 46 carrying the upper contacts, 40 through 43, for the switches, 35 through 38, respectively, and the movable contact 45 for switch 39, start to descend. This downward movement causes the upper contact for the probe limit switch 39 to become disengaged, an engagement of its lower contact. Engagement of the lower contact by switch 39 conditions for closure and energizing circuit, to the "up" winding 134 of reversing switch 86, which extends from supply source $L_3$ (connected to one side of all switches 35 to 39) through switch 39, now engaging its lower contact, a conductor 202, the "up" winding 134, conductor 204, to contact 168 of relay 80. As contact 168 is now not engaged by the left hand contact of armature 104, the circuit to supply conductor $L_1$ through conductor 175 is not completed.

It will be noted that the "red" signal lamp 62 is now lighted by a circuit extending from ground through lamp 62, conductor 206, contact 216 (the left hand, when viewed in Fig. 4, insulated armature contact of latching relay 76) contacts 246, 268 and 282, each normally engaged by the left hand insulated armature contacts of the respective latching relays 77, 78 and 79, and back to supply conductor $L_1$.

Very high glass level

When the glass level is very high and the tip of the probe 17 contacts the molten glass 12 before the first relay control switch 35 is closed, none of the latching relays, 76 through 79 of the electric control mechanism are energized, and the batch feeder 13 will not operate because its motor 14 is not energized during this cycle.

Upon the probe 17 contacting the molten glass 12 and thus being "grounded," the aforementioned partially completed circuit to the "down" coil 99 of the relay 80 and the transformer 88, is completed, thus energizing coil 99 to unlatch relay 80, causing its armature 104 to gravitate downwardly to its normal position. This movement of the armature 104 immediately effects disengagement of the contacts 172 and 174 of the relay 80 and reengagement of the contacts 168 and 170 of relay 80.

Disengaging the upper contact 172 de-energizes the coil of the "down" solenoid 122 of reversing switch 86 and engaging of the lower contact 168 of the relay 80 completes the energizing circuit to the coil 134 of the "up" solenoid 138, thereby shorting across the contacts 140—140, 142—142 and 144—144, of the switch 86, reversing the direction of rotation of the probe motor 27 and causing the probe 17 to retract from the molten glass 12.

As the probe 17 just about reaches its upper limit of travel, the lower contact of the probe limit switch 39 is disengaged by the contact 45 and the upper contact again engaged. The breaking of the lower contact with the switch 39 opens the previously traced circuit to the coil 134 of the "up" solenoid of the reversing switch 86, thereby deenergizing said coil to release the armature 138 of the switch 86 and stop the operation of the probe motor 27. The probe 17 then remains motionless until the initiation of a new cycle by the continuously operating timer 74.

Slightly high glass level

When the glass level is "slightly high" (i. e. slightly lower than the above described "very high" condition) the relay control switch 35 is closed by its contact 40 before the probe 17 contacts the glass 12. This causes energization of the "up" coil 90 of the latching relay 76, with the raising and latching of its armature 100 and the engagement of contact 210. This energizing circuit extends from supply conductor $L_1$ through conductors 155, 228, 226, coil 90, thence by a conductor 224 and now closed switch 35 to supply conductor $L_3$. Raising of this armature 100 breaks contact at 216 and deenergizes "red" signal lamp 62. Immediately after contact 40 engages switch 35, the probe 17 will contact the top of the molten glass 12 completing the aforementioned energizing circuits to cause reversal of the probe motor 27 as previously described.

However, engagement of contact 210 by the left hand (Fig. 4) insulated armature contact of relay 76 (now latched in its "up" position) completes a circuit to the "amber" signal lamp 63 which extends from supply source $L_1$ (through normally closed contacts 246, 268 and 282) the now closed contact 210 to the lamp 63 and thence to ground. It will be remembered that at this instant the timer motor 118 is still rotating and the cam 107 will accordingly close switch 112, and since the right hand (Fig. 4) insulated contact of relay 76 has closed contact 212, the batch feeder motor 14 rotates and supplies a predetermined amount of raw material to the furnace 10 for the duration of the engagement of the cam 107 with switch 112.

This energizing circuit for batch feeder motor 14 extends from conductor 152, which is actually supply source $L_2$, as long as cam operated switch 112 is closed (In the typical case under discussion, where a cycle was set to be three minutes long by adjusting the speed of the cam shaft on the timer, this switch 112 would be closed by cam 107 for slightly less than a minute and a half.), through closed switch 112, conductor 231, contact 212 of relay 76, the right hand insulated armature contact of relay 76, conductor 233, normally closed lower contact 234 of the latching relay 77, the right hand insulated armature contact of this relay 77, conductor 236, similar normally closed lower contact 238 of the latching relay 78, right hand insulated armature contact of relay 78, conductor 239, the batch charger motor 14, and hence to "ground."

The batch feeder motor 14 accordingly operates for a period of time determined by the length of the high dwell of cam 107. As previously mentioned, the opening of the lower contact of the probe stop limit switch 39, just prior to the probe 17 reaching its upper limit of travel, de-energizes the coil 134 of the "up" solenoid 138 of the switch 86 and stops operation of the probe motor 27. Simultaneously the upper contact of probe limit switch 39 is closed by contact 45, upon return of the probe 17 and the contact-carrying yoke 46 to their upper or normal position, and a circuit is then conditioned for completion from supply conductor $L_3$ through switch 39, conductor 200 (common to all the "down" coils of relays 76 to 79) "down" coil 95 of the relay 76, the common conductor 160, the now open cam operated switch 111, and the common conductor 152 to supply source $L_2$. Coil 95 is thus not energized at this time due to switch 111 being open. At the start of a new cycle switch 111 is closed by cam 106, thus energizing coil 95 momentarily.

Energization of coil 95 trips armature 100, causing it to gravitate downward, thereby again opening the normally open contacts 210 and 212, and again closing the normally closed lower contacts 216 and 218 of the latching relay 76. Opening the upper contact 210 extinguishes the amber signal lamp 63, while opening of the contact 212 simply introduces another break in a circuit already open (by switch 112 operated by cam 107) to batch feeder motor 14. Closure of the lower contact 216 again lights the red signal lamp 62.

*Normal glass level*

When the glass level is normal, the second relay control switch 36 is closed (as well as the first relay control switch 35) before the probe 17 contacts the glass 12. Closure of this switch 36 completes a circuit to the "up" coil 91 of the second latching relay 77 a brief interval after (depending upon adjustment of contact 41) switch 35 causes energization of "up" coil 90 as previously described. This circuit extends from supply source $L_3$ through now closed switch 36, a conductor 249 to the "up" coil 91 of relay 77, thence back to supply conductor $L_1$ through conductors 228 and 155.

Raising of armature 101 closes a pair of normally open contacts 240 and 242 of the relay 77 and opens the pair of normally closed lower contacts 234 and 246. The closing of the upper contact 240 lights the green signal lamp 64. Amber signal light 63 which was lit by closure of contacts 210 on relay 76 is now extinguished by the opening of contacts 246 on relay 77. Closure of the upper contact 242 now completes a circuit extending from the common conductor 152 (which can be considered as line conductor $L_2$) through now closed switch 113, conductor 252, contact 242, the upper right hand contact of armature 101, conductor 236, contact 238, the lower right hand contact of armature 102 of relay 78, conductor 239 to batch feeder motor 14, and to ground.

Batch motor 14 accordingly supplies material to the glass furnace for a period of time as determined by the length of the high dwell of cam 108. This will be one and one half minutes in the typical case under discussion. Thereafter switch 113 is opened, stopping batch feeder motor 14 and the introduction of material into the glass furnace. Meanwhile the probe 17 has returned to its uppermost position, having contacted the glass. Just prior to reaching the upper limit of its ascent, it opens the lower contacts and closes the upper contact of the limit switch 39, as previously explained, thereby stopping the probe motor.

*Slightly low glass level*

When the glass level is only slightly below normal, the third relay control switch 37 is closed by the contact 42 carried by the yoke 46 during its downward movement along with the probe 17 to contact the glass 12. (Switches 35 and 36 are likewise closed by the respective contacts 40 and 41.) Upon closure of switch 37, a circuit is completed which extends from supply source $L_3$, through the now closed switch 37, a conductor 260, the "up" coil 92 of relay 78, and the conductors 228 and 155, back to supply source $L_1$. Coil 92 is accordingly energized, which causes the armature 102 to rise, thereby opening normally closed contacts 238 and 268 and closing normally open contacts 262 and 264.

Closure of contact 262 energizes the second amber signal lamp 65, and extinguishes the first amber signal lamp 63 and green signal lamp 64, which were illuminated by raising of the armature 100 and 101 with closure of the respective contacts 210 and 240. This circuit extends from line conductor $L_1$, through the normally closed contact 282 of relay 79, the left hand armature contact of relay 78 now engaging contact 262, conductor 272, and the second amber signal lamp 65, to ground. At the same time, closure of contact 262 again completes a circuit to the batch feeder motor 14, from the common conductor 152 (again continuing conductor $L_2$ as long as cam operated switch 114 is closed) through now closed cam operated switch 114, conductor 274, contact 264 now engaged by the upper right hand contact of armature 102, conductor 239, and the batch feeder motor 14 to ground.

Batch feeder motor 14 will then again operate to supply raw material to the glass furnace 10 for a period of time determined by the high dwell of the cam 109 which, in the typical case under discussion, will be slightly more than a minute and a half. At the expiration of this time period, switch 114 is opened by continued rotation of the timer motor 118, thus interrupting the circuit previously traced and de-energizing the batch feeder motor 14. Meanwhile, the probe 17 having retracted after contacting the glass 12, will reach its upper limit of travel, opening the lower contact and closing the upper contact of switch 39 to stop rotation of the probe motor and condition the "down" coils 95, 96, 97 and 98, of the respective latching relays 76, 77, 78 and 79, for energization during the next cycle when cam-operated switch 111 will close momentarily.

*Very low glass level*

When the glass level is very low, the probe 17 descends to the lower limit of its travel without contacting the glass 12 before the fourth relay control switch 38 is closed by the contact 43. Consequently, relay control switches 35, 36, 37 and 38 will all be closed, with the probe having reached the lower limit of its travel and stopped at such level, as hereinafter explained. Closure or relay control switch 38 completes the circuit from supply conductor $L_3$ through the now closed switch 38, conductor 280, the "up" coil 93 of the latching relay 79, and conductors 228 and 155 back to the supply conductor $L_1$.

Energization of "up" coil 93 accordingly causes the armature 103 to rise, opening normally closed contacts 182 and 282 and closing normally open contacts 286 and 288. Opening contact 182 interrupts the circuit to the "down" coil 122 of probe motor relay 86, thus causing armature 126 to gravitate downwardly, interrupting the circuit to the probe motor 27 with the probe in its lower limit of travel where it temporarily remains.

Closure of contact 286 now energizes the lower red signal lamp 66 through a circuit extending from the supply source $L_2$ through said contact 286, conductor 300, and signal lamp 66 to ground. The upper amber signal lamp 63, the green signal lamp 64, and the lower amber signal lamp 65 will be extinguished at this time, because of the energization of relays 77, 78 and 79 and opening of their respective contacts 246, 268 and 282. At the same time, closure of contact 288 completes a circuit to batch feeder motor 14 from line conductor $L_2$ through the upper right hand insulated contact of armature 103, contact 288, conductors 290 and 274, contact 264 of latching relay 78, now engaged by the upper right hand insulated contact of armature 102, conductor 239, and the batch feeder motor 14 to ground.

It will thus be noted that this circuit to batch feeder motor 14 is entirely independent of any of the cam-operated switches forming part of the timer 74. Raw material will accordingly be introduced continuously into the furnace 10, even after the timer cam shaft 116 has completed its revolution which in the case under consideration, takes about three minutes. However, upon completion of its cycle in this period of about three minutes, the closing of switch 111 by cam 106 at the start of the next cycle, which in the preceding cases energized momentarily coils 94, 95, 96, 97, 98 of relays 80, 76, 77, 78, and 79, respectively, is here ineffective, since one terminal of coils 94, 95, 96, 97 and 98 is at the moment open-circuited by the opening of the upper contact of switch 39 due to the probe being at the lowest point of its downward movement.

The batch feeder motor 14 continues to supply the material until such time as the glass rises so as to contact the now stationary probe 17. Contact of the glass level with the probe completes a circuit to the "up" coil 134 of probe motor relay 86, causing the probe 17 to ascend until (just prior to reaching the upper limit of its travel) it opens the lower contact and closes the upper contact of the probe limit switch 39 which interrupts the circuit to the "up" coil 134, thereby de-energizing the probe motor 27 and conditioning a circuit for energization of the "down" coils 95, 96, 97, and 98 of respective latching relays 76, 77, 78 and 79 by switch 111 at the start of a new cycle.

When this occurs, gravitation of the respective armatures, and particularly armature 103, interrupts the circuit to the batch feeder motor 14 by opening of the contact 288, stopping operation of the motor and the feeding of raw material into the furnace. The entire apparatus is thus now in condition for a repetition of its cycle as hereinbefore explained, because the timer 74 has again started its cyclic operation requiring a three minute interval for a complete revolution of the cam shaft 116, together with the respective cams rotated thereby.

*Summary of operation*

From the foregoing, it will be seen that a typical cycle of operation of my control apparatus is as follows. Upon closing the main switch, the cycle motor 118 starts operating continuously. The beginning of a cycle is started by the cam assembly when the high dwell of the cam 106 closes the switch 111 to energize the "up" coil 94. The resultant raising of the armature 104 energizes "down" solenoid 122 to close the circuit to the probe motor 27 to effect downward movement of the probe 17. When the probe actually engages the molten glass 12, it is retracted by deenergization of "down" solenoid 122 and closing a circuit through the "up" solenoid 134 to reverse the connections to the probe motor 27.

Whether or not batch material is fed to the glass-melting furnace depends during a cycle on the height of the molten glass therein. If the glass is high, so that the probe 17 engages it before switch 35 is closed, then the top red lamp 62 stays on and there is no batch material fed to the furnace during the cycle. If the glass is only slightly high, so that only the switch 35 is closed then the top red lamp 62 is deenergized, the top amber lamp 63 energized, and the circuit established raises relay 76 and closes a circuit to batch motor 14 through switch 112 (during the portion of cycle determined by relative length of high dwell on cam 107) right hand up contact on relay 76, and the right hand down contacts on relays 77 and 78, so that batch material is fed to the furnace only during a part of the cycle.

If on the other hand, the glass level is normal, so that switch 36 is also closed, only the green lamp 64 stays energized, and batch material is fed to the furnace during a period of time represented by the relative length of the high dwell on the cam 108. If, however, the glass level is slightly low, so that the switch 37 is likewise closed, only the low amber lamp 65 stays energized; and, batch material is fed to the furnace during that part of the cycle represented by the relative length of the high dwell on the cam 109. If the glass level is so low that all of the switches 35 to 38, inclusive, are closed before the probe engages the glass, then only the low red lamp 66 stays energized and batch material is fed to the furnace during the entire cycle, after closing the switch 111, until it rises high enough to engage the probe, whereupon feeding of batch material to the furnace is stopped.

Thus, the amount of batch material fed to the furnace during each cycle is generally proportional to the distance the probe 17 is initially disposed from engagement with the glass 12, or the distance the probe travels down before it starts to reverse.

It can thus be seen that an automatic control apparatus is herein provided for maintaining the molten glass in the melting tank or furnace at a desired level. Moreover, the automatic control apparatus of the present invention makes a periodic check to determine the precise level of the molten glass in the furnace and, depending on such level, causes the introduction of the approximate quantity of raw materials necessary to raise the level of the molten glass to a desired height. Such apparatus, once energized by an operator, is entirely automatic thereafter in making the necessary tests and introducing the necessary quantity of raw material as called for by circumstances.

Although only one specific embodiment is shown and described, it is to be understood that modifications can be made without deviating from the spirit and scope of the invention.

I claim:

1. In combination for a glass furnace, a probe assembly for measuring the existing glass level in said glass furnace and an electric control mechanism for adjusting the batch feeding rate to maintain a desired level in said furnace, said probe assembly having a probe normally located at a relatively small distance above the maximum level to which the glass may rise, means moving said probe during each of predetermined time intervals toward and away from said glass, and a gaging unit having a plurality of gaging contacts movable with said probe, a gaging switch beneath each contact, said gaging contacts being arranged at levels varying from relatively low to relatively high so as to successively close their gaging switches as the probe descends, said electric control mechanism energizing a driving means continually during each interval when the reciprocation is large, for a major portion of each interval when the reciprocation is smaller, for about half of each interval when the amount of reciprocation indicates normal glass level, for a still less proportion of each interval when the reciprocation is relatively small, and not at all when the reciprocation indicates a very high glass level.

2. In combination for a glass furnace, a probe assembly for measuring the existing glass level in said glass furnace and an electric control mechanism for adjusting the batch feeding rate to maintain a desired level in said furnace, said probe assembly having a vertically reciprocable operating rod, a flexible yoke on said operating rod and provided with an extension bracket, a glass level probe normally located at a relatively small distance above the maximum level to which the glass may rise, a threaded collar on said operating rod, an operating screw in engagement with said collar, means for rotating said operating screw and a gaging unit having a plurality of gaging contacts and movable with said operating rod, a gaging switch beneath each contact, said gaging contacts being arranged at levels varying from relatively low to relatively high so as to successively close their gaging switches as the probe descends, said electric control mechanism energizing a driving means continually during each interval when the reciprocation is large, for a major portion of each interval when the reciprocation is smaller, for about half of each interval when the amount of reciprocation indicates normal glass level, for a still less proportion of each interval when the reciprocation is relatively small, and not at all when the reciprocation indicates a very high glass level.

3. In combination for a glass furnace, a probe assembly for measuring the existing glass level in said furnace and an electric control mechanism for adjusting the batch feeding rate to maintain a desired level in said furnace, said probe assembly having a probe between a position above the level of molten glass in said furnace and a position where its lower end just touches the top surface of said glass and means for reciprocating said probe, said electric control mechanism having a cycle timer comprising a series of cams with high dwells of varying and correspondingly increasing high dwell lengths, means for driving said timer so that each cam makes a complete revolution in said predetermined time interval, a corresponding series of cam switches controlled by said cams so that as the timer rotates, the cam switches are closed and opened, one of said cam switches on closing initiating a timing cycle and the other cam switches respectively energizing a driving means where the glass level is slightly high, normal and slightly low, said cams respectively closing a cam switch for a selected portion of the time interval to in turn energize said driving means, continually if the glass level is very low, not at all if the glass level is very high and for varying proportions of said time intervals from a relatively large proportion if the glass level is below normal to a relatively small proportion if the glass level is above normal.

4. In combination for a glass furnace, a probe assembly for measuring the existing glass level in said furnace and an electric control mechanism for adjusting the batch feeding rate to maintain a desired level in said furnace, said probe assembly having a probe between a position above the level of molten glass in said furnace and a position where its lower end just touches the top surface of said glass and means for reciprocating said probe, said electric control mechanism having a corresponding series of relays with up solenoids respectively connected for energization through said gaging switches, a cycle timer comprising a series of cams with high dwells of varying lengths, means for driving said timer so that each cam makes a complete revolution in said predetermined time interval, a corresponding series of cam switches controlled by said cams so that as the timer rotates, the switches are closed and opened, one of said cam switches on closing initiating a timing cycle and the other switches respectively controlling circuits through the respective relays to respectively energize a driving means when the glass level is slightly high, normal and slightly low, said cams being of correspondingly increasing high dwell lengths, and respectively closing a cam switch through an energized relay to energize said driving means continually if the glass level is very low, not at all if the glass level is very high, and for varying proportions of said time intervals from a relatively large proportion if the glass level is below normal to a relatively small proportion if the glass level is above normal.

5. In combination for a glass furnace, a probe assembly for measuring the existing glass level in said furnace and an electric control mechanism for adjusting the batch feeding rate to maintain a desired level in said furnace, said probe assembly having a probe between a position above the level of molten glass in said furnace and a position where its lower end just touches the top surface of said glass, means for reciprocating said probe, and a series of relay control switches operable by said means for reciprocating said probe, said electrical control mechanism comprising a multi-section adjustable repeat cycle timer comprising a first holdover section, a second very high glass level section, a third slightly high glass level section, a fourth normal glass level section, and a fifth slightly low glass level section, each of said sections comprising a cam and a switch operated thereby, means for rotating said cams, a repeat cycle switch for controlling said timer, and five latching-type relays in electrical series relationship with each other, one of said relays being in electrical series with one of said relay control switches and the third section of said timer for reducing the normal batch feeding rate; a second latching relay being in electrical series with a second relay control switch, and the fourth section of said timer for providing a normal batch feeding rate to said furnace, a third latching relay in electrical series with a third relay control switch and the fifth section of said timer for increasing the normal batch feeding rate to said furnace, and a fourth latching relay in electrical series with a fourth relay control switch for stopping the downward movement of said probe and providing a continuous batch charging rate directly to said furnace.

References Cited in the file of this patent
UNITED STATES PATENTS

| | | |
|---|---|---|
| 1,961,893 | Wadman et al. | June 5, 1934 |
| 2,565,136 | Kretzmer, Jr. | Aug. 21 1951 |
| 2,585,607 | Whitmore et al. | Feb. 12, 1952 |
| 2,613,002 | Light et al. | Oct. 7, 1952 |